(12) United States Patent
Kim et al.

(10) Patent No.: US 8,941,587 B2
(45) Date of Patent: Jan. 27, 2015

(54) METHOD AND DEVICE FOR GESTURE RECOGNITION DIAGNOSTICS FOR DEVICE ORIENTATION

(75) Inventors: Sangki Kim, Busan (KR); Junhee Yeo, Seoul (KR)

(73) Assignee: LG Electronics Inc., Seoul (KR)

( * ) Notice: Subject to any disclaimer, the term of this patent is extended or adjusted under 35 U.S.C. 154(b) by 262 days.

(21) Appl. No.: 13/220,361

(22) Filed: Aug. 29, 2011

(65) Prior Publication Data

US 2012/0262372 A1     Oct. 18, 2012

Related U.S. Application Data

(63) Continuation of application No. PCT/KR2011/002630, filed on Apr. 13, 2011.

(51) Int. Cl.
| | |
|---|---|
| *G06F 3/033* | (2013.01) |
| *G09G 5/08* | (2006.01) |
| *G06F 1/16* | (2006.01) |
| *G06F 3/01* | (2006.01) |
| *G06F 3/03* | (2006.01) |

(52) U.S. Cl.
CPC .............. *G06F 1/1694* (2013.01); *G06F 3/017* (2013.01); *G06F 3/0304* (2013.01); *G06F 2200/1614* (2013.01); *G06F 2200/1637* (2013.01); *G06F 2340/0442* (2013.01); *G06F 2340/0492* (2013.01)
USPC .......................................... 345/158; 345/156

(58) Field of Classification Search
USPC ......................................... 345/158; 455/556.1
See application file for complete search history.

(56) References Cited

U.S. PATENT DOCUMENTS

| | | | |
|---|---|---|---|
| 2002/0175896 A1* | 11/2002 | Vaananen et al. | ............. 345/158 |
| 2004/0239626 A1* | 12/2004 | Noguera | ........................ 345/158 |
| 2005/0212751 A1* | 9/2005 | Marvit et al. | ................. 345/156 |
| 2009/0207138 A1 | 8/2009 | Thorn | |
| 2009/0228841 A1 | 9/2009 | Hildreth | |
| 2009/0262074 A1* | 10/2009 | Nasiri et al. | .................. 345/158 |
| 2010/0031169 A1 | 2/2010 | Jang et al. | |
| 2010/0060576 A1 | 3/2010 | Underkoffler et al. | |
| 2010/0087230 A1 | 4/2010 | Peh et al. | |

* cited by examiner

*Primary Examiner* — Gerald Johnson
(74) *Attorney, Agent, or Firm* — Birch, Stewart, Kolasch & Birch, LLP

(57) ABSTRACT

Systems, circuits, and devices for recognizing gestures are discussed. A mobile device includes a housing, an orientation sensor, a camera implemented on the housing, a memory for storing a lookup table comprising multiple gestures and corresponding commands, and a controller coupled to the orientation sensor, the camera, and the memory. The controller is configured to generate trace data corresponding to a gesture captured by the camera, wherein x, y, and z coordinates of the trace data are applied according to an orientation of the housing during the gesture. The controller is also configured to determine an orientation angle of the housing detected by the orientation sensor. The controller is further configured to recognize the gesture through accessing the lookup table based on the trace data and the orientation angle of the housing.

18 Claims, 24 Drawing Sheets

FIG. 2B

|    | X-COORDINATE 252 | Y-COORDINATE 254 |
|----|------------------|------------------|
| P1 | 8                | 5                |
| P2 | 11               | 5                |
| P3 | 13               | 5                |
| P4 | 13               | 3                |
| P5 | 11               | 3                |
| P6 | 8                | 3                |

TABLE 250

FIG. 3B

|    | X-COORDINATE 352 | Y-COORDINATE 354 |
|----|------------------|------------------|
| Q1 | 9                | 9                |
| Q2 | 9                | 11               |
| Q3 | 9                | 13               |
| Q4 | 11               | 13               |
| Q5 | 11               | 11               |
| Q6 | 11               | 9                |

TABLE 350

(a > b, c > d & e > f)

| TRACE DATA 704 | ORIENTATION ANGLE 706 | GESTURE 708 | COMMAND 710 |
|---|---|---|---|
|  | 0° |  | DISPLAY A MAIN MENU HORIZONTALLY |
|  | 90° | | |
|  | 90° |  | DISPLAY A MAIN MENU VERTICALLY |
|  | 0° | | |
| ⋮ | ⋮ | ⋮ | ⋮ |

LOOKUP TABLE 702

METHOD AND DEVICE FOR GESTURE RECOGNITION DIAGNOSTICS FOR DEVICE ORIENTATION

CROSS REFERENCE TO RELATED APPLICATIONS

This application is a continuation of and claims priority to, PCT/KR2011/002630, filed on Apr. 13, 2011.

BACKGROUND OF THE INVENTION

1. Field of the Invention

Embodiments of the disclosure generally relate to the field of electronics, and more particularly to control systems, circuits, and devices.

2. Discussion of the Background Art

A mobile device is a pocket-sized computing device, typically having a display screen with touch input and/or a miniature keyboard. The input and output of the mobile device are often combined into a touch-screen interface. The mobile device includes many applications and includes a mobile computer, a mobile interne device, a personal digital assistant/enterprise digital assistant, a calculator, a handheld game console, a portable media player, a digital still camera, a digital video camera, a digital camcorder, a mobile phone, a pager, a personal navigation device, etc. Some of the applications of the mobile device include digitizing notes, sending and receiving invoices, asset management, recording signatures, managing parts, scanning barcodes, etc.

Gesture recognition is a technology that makes it possible for a device to interpret (human) gestures via mathematical algorithms. Gestures can originate from any bodily motion or state but commonly originate from the face or hand. Gesture recognition is a way for computers or machines to understand human body language, thus building a richer bridge between machines and humans than text-based user interfaces or even graphic-based user interfaces which still limit the majority of input to keyboard and mouse.

SUMMARY OF THE INVENTION

This summary is provided to comply with 37 C.F.R. §1.73, requiring a summary of the invention briefly indicating the nature and substance of the invention. It is submitted with the understanding that it will not be used to interpret or limit the scope or meaning of the claims.

Systems, circuits, and devices for recognizing gestures are discussed. In one embodiment of the invention, there is a mobile device for recognizing a gesture includes a housing, an orientation sensor, a camera implemented on the housing, a memory for storing a lookup table comprising multiple gestures and corresponding commands, and a controller coupled to the orientation sensor, the camera, and the memory. The controller is configured to generate trace data corresponding to a gesture captured by the camera, where x, y, and z coordinates of the trace data are applied according to an orientation of the housing during the gesture. The controller is also configured to determine an orientation angle of the housing detected by the orientation sensor. The controller is further configured to recognize the gesture through accessing the lookup table based on the trace data and the orientation angle of the housing.

In another embodiment of the invention, there is a mobile device for repositioning a pointer includes a housing, a display unit, an orientation sensor, a camera implemented on the housing, and a controller coupled to the display unit, the orientation sensor, and the camera. The controller is configured to generate a pointer on a unit portion of an image displayed on the display unit in response to a capture by the camera of a remote pointing object pointing to the unit portion on the image on the display unit, where the image is displayed on the display unit according to a first orientation. The controller is also configured to display the image on the display unit according to a second orientation when an orientation of the housing detected by the orientation sensor indicates a shift to the second orientation. The controller is further configured to identify coordinates of the unit portion of the image displayed according to the second orientation and display the pointer on the unit portion of the image based on the coordinates of the unit portion of the image displayed according to the second orientation.

In yet another embodiment of the invention, there is a mobile device for repositioning a pointer includes a housing, a display unit, an orientation sensor, a camera implemented on the housing, a controller coupled to the display unit, the orientation sensor, and the camera. The controller is configured to generate a pointer on a first position proximate to an image displayed on the display unit in response to a capture by the camera of a remote pointing object pointing to the first position on the display unit, where the image is displayed on the display unit according to a first orientation. The controller is also configured to measure distances between the first position and each of two or more unit portions on the image, and display the image on the display unit according to a second orientation when an orientation of the housing detected by the orientation sensor indicates a shift to the second orientation. The controller is further configured to identify coordinates of the two or more unit portions of the image displayed according to the second orientation and display the pointer on a second position proximate to the image based on the coordinates of the two or more unit portions of the image displayed according to the second orientation and the distances between the first position and each of the two or more unit portions.

In yet another embodiment of the invention, there is an image display device that includes a housing; an orientation sensor; a display; a camera; and a controller. The orientation sensor is configured to determine an orientation angle of the housing relative to a predetermined coordinate system. The camera is configured to capture a user gesture in a field of view of the camera. The controller is operatively coupled to the orientation sensor, the camera, and the display, and is configured to convert the gesture to an execution command based on the orientation angle.

In yet another embodiment of the invention, there is an image display device that includes a housing; an orientation sensor; a display; a camera; and a controller. The orientation sensor is configured to determine an orientation angle of the housing relative to a predetermined coordinate system. The camera is configured to capture a user gesture in a field of view of the camera. The controller is operatively coupled to the orientation sensor, the camera, and the display, and is configured to display a pointer on the display at a specific location relative to the displayed image, the specific location corresponding to a first orientation of the housing and a detected location of the object, and when the orientation of the housing is changed to a second orientation, reorient the image according to the second orientation and while maintaining the pointer at the specific location relative to the displayed image.

In yet another embodiment of the invention, there is an image display device that includes a housing; an orientation sensor; a display; a camera; and a controller. The orientation sensor is configured to determine an orientation angle of the housing relative to a predetermined coordinate system. The camera is configured to capture a user gesture in a field of view of the camera. The controller is operatively coupled to the orientation sensor, the camera, and the display, and is configured to display a pointer on the display at a specific location, the specific location corresponding to a first orientation of the housing and a detected location of the object, and when the orientation of the housing is changed to a second orientation, reorient the image according to the second orientation and while maintaining the pointer at the specific location. The specific location is an absolute location on the display that is not changed when the orientation of the housing is changed to the second orientation.

Other features of the embodiments will be apparent from the accompanying drawings and from the detailed description that follows.

BRIEF DESCRIPTION OF THE VIEWS OF DRAWINGS

Example embodiments are illustrated by way of example and not limitation in the figures of the accompanying drawings, in which like references indicate similar elements and in which:

FIGS. 2A and 2B illustrate an exemplary view of the mobile device of FIG. 1 in a first orientation for recognizing a gesture, according to one embodiment of the present invention.

FIGS. 3A and 3B illustrate an exemplary view of the mobile device of FIG. 1 in a second orientation for recognizing a gesture, according to one embodiment of the present invention.

Figure 1:
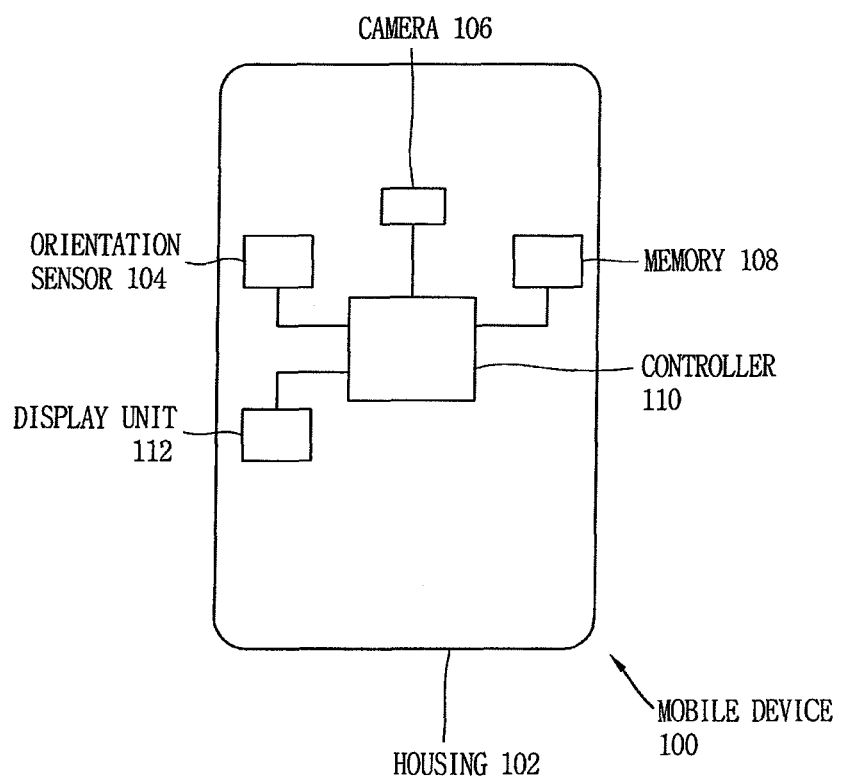
FIG. 1 is an exemplary block diagram of a mobile device for recognizing a gesture and/or for repositioning a pointer upon a shift in the orientation of the mobile device, according to one embodiment of the present invention.

Other features of the present embodiments will be apparent from the accompanying drawings and from the detailed description that follows. Further, the drawings described herein are for illustration purposes only and are not intended to limit the scope of the present disclosure in any way.

DETAILED DESCRIPTION

A method, device and/or system are discussed that recognize a gesture agnostic to device orientation. According to embodiments of the present invention, the mobile device (e.g., a tablet PC, a smart phone, etc.) may interpret a gesture applied to the mobile device in the same manner regardless of the orientation of the mobile terminal (e.g., a portrait orientation or a landscape orientation) during the gesture. As the conventional mobile device can be tilted and display an image in multiple (e.g., two) different orientations, the same gesture applied to the conventional mobile device may be interpreted differently depending on its orientation during the gesture. That is, the gesture applied to the mobile in the portrait orientation (e.g., the upright position) may be interpreted different from the same gesture applied to the mobile device in the landscape position (e.g., inclined ninety (90) degrees to the right from the upright position).

In order to address limitations associated with the prior art, according to various embodiments of the present invention, the mobile device of the present invention is configured to generate trace data by capturing a gesture with a camera of the mobile device, determine an orientation angle or tilt angle of the mobile device using an orientation sensor of the mobile device, and recognize the gesture based on the trace data and the orientation angle, where the trace data and orientation angle may be compared with a set of reference data (e.g., shapes of candidate gestures, orientation angles, etc.) stored in a memory of the mobile device.

Further, as the mobile device may be tilted freely, a pointer based on a gesture (e.g., a finger pointing to the pointer position) may be lost when the mobile device shifts its orientation. This is especially so since the user may not able to accurately reposition the pointer as the image on the mobile device is displayed in the shifted orientation (e.g., from the portrait orientation to the landscape orientation). In order to solve this problem, according to various embodiments of this disclosure, the mobile device is configured to generate a pointer on a particular position of an image displayed on the display unit when the camera captures a remote pointing object (e.g., a finger) pointing to the position on the image in a first orientation (e.g., the portrait orientation).

The mobile device then displays the image on the display unit according to a second orientation when the mobile device shifts to the second orientation (e.g., the landscape orientation). As the shift in the orientation of the mobile device is carried out, the particular position of the image may be flagged or tagged with metadata indicating the position of the pointer relative to the area of the image displayed on the mobile device in the first orientation. The mobile device further identifies coordinates of the unit portion of the image displayed according to the second orientation, and display the pointer on the unit portion of the image based on the coordinates of the unit portion of the image displayed according to the second orientation.

Reference will now be made in detail to the embodiments of the invention, examples of which are illustrated in the accompanying drawings. While the invention will be described in conjunction with the embodiments, it will be understood that they are not intended to limit the invention to these embodiments. On the contrary, the disclosure is intended to cover alternatives, modifications and equivalents, which may be included within the spirit and scope of the invention. Furthermore, in the detailed description, numerous specific details are set forth in order to provide a thorough understanding of the present disclosure. However, it will be obvious to one of ordinary skill in the art that the present disclosure may be practiced without these specific details. In other instances, well known methods, procedures, components, and circuits have not been described in detail as not to unnecessarily obscure aspects of the present invention.

FIG. 1 is an exemplary block diagram of a mobile device 100 for recognizing a gesture and/or for repositioning a pointer upon an orientation shift, according to one embodiment of the present invention. In FIG. 1, the mobile device 100 comprises a housing 102, an orientation sensor 104, a camera 106 implemented on or in the housing 102, a memory 108 for storing a lookup table comprising multiple gestures and corresponding commands, and a controller 110 operatively coupled to the orientation sensor 104, the camera 106, and the memory 108. In one example implementation, the orientation sensor 104 is an accelerometer, a gyroscope, or a magnetometer. In one example implementation, the camera 106 is a depth-aware camera, a stereo camera, or a digital camera.

In one embodiment of the present invention, which is illustrated in FIG. 2A through FIG. 8, the controller 110 is configured to recognize a gesture by tracking a target object, such as a hand, a finger, a stylus, etc., moving in a vicinity of the mobile device 100 using the camera 106 regardless of the orientation of the mobile device 100.

In one embodiment of the present invention, which is illustrated in FIG. 9A through FIG. 11, the controller 110 is configured to reposition a pointer on the same portion of an image when the image is displayed in a different configuration or orientation according to a shift in the orientation of the mobile device 100.

In one embodiment of the present invention, which is illustrated in FIG. 12A through FIG. 15, the controller 110 is configured to reposition a pointer on the same position with respect to an image in a vicinity of the pointer when the image is displayed in a different configuration or orientation according to a shift in the orientation of the mobile device 100.

Figure 16:
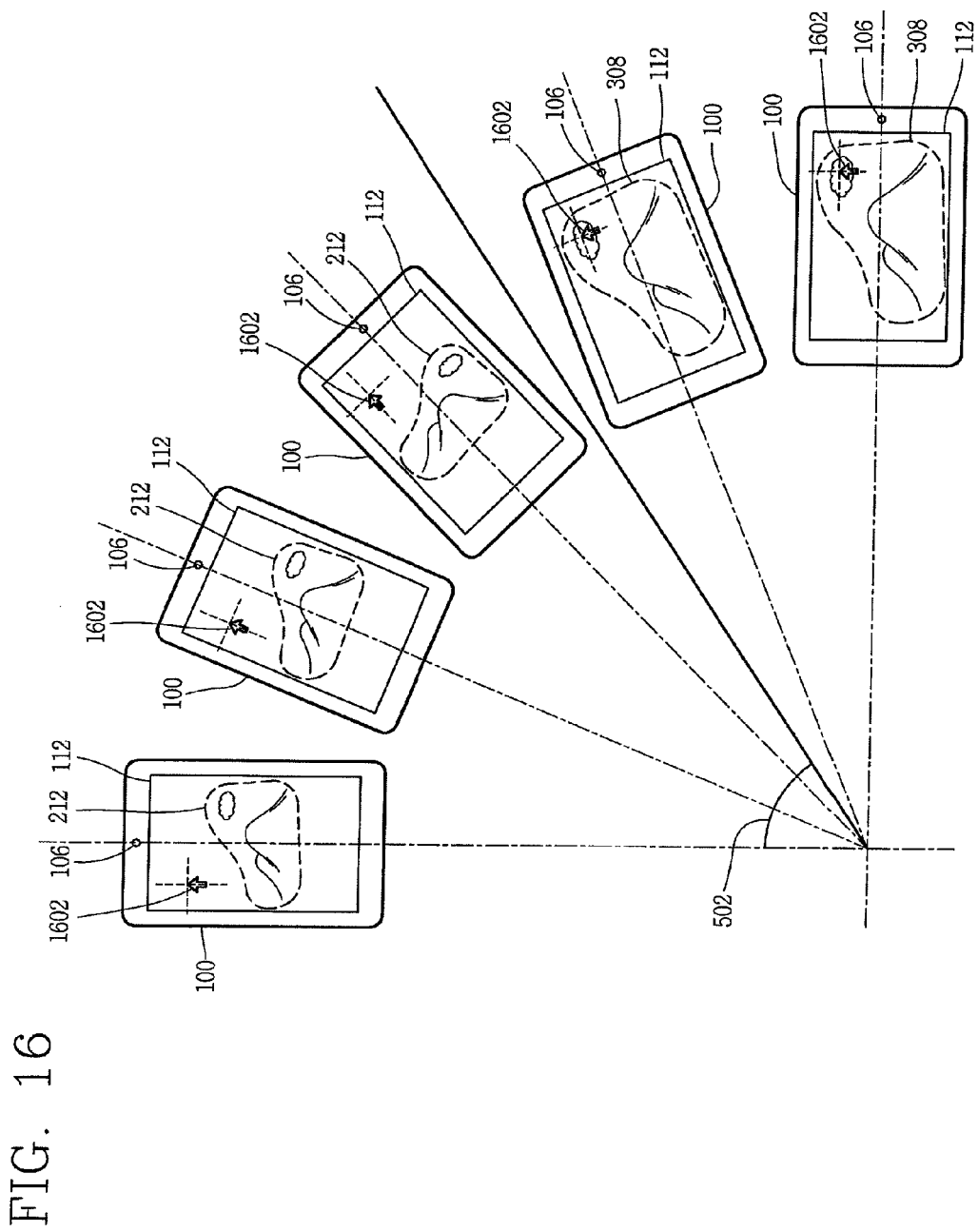
FIG. 16 illustrates an exemplary view of the mobile device of FIG. 1 in different orientations maintaining the absolute position of a pointer in response to a shift in the orientation of the mobile device, according to one embodiment of the present invention.

In one embodiment of the present invention, which is illustrated in FIG. 16, the controller 110 is configured to maintain a pointer at the same position on the display unit irrespective of a shift in the orientation of the mobile device 100.

Figure 2A:
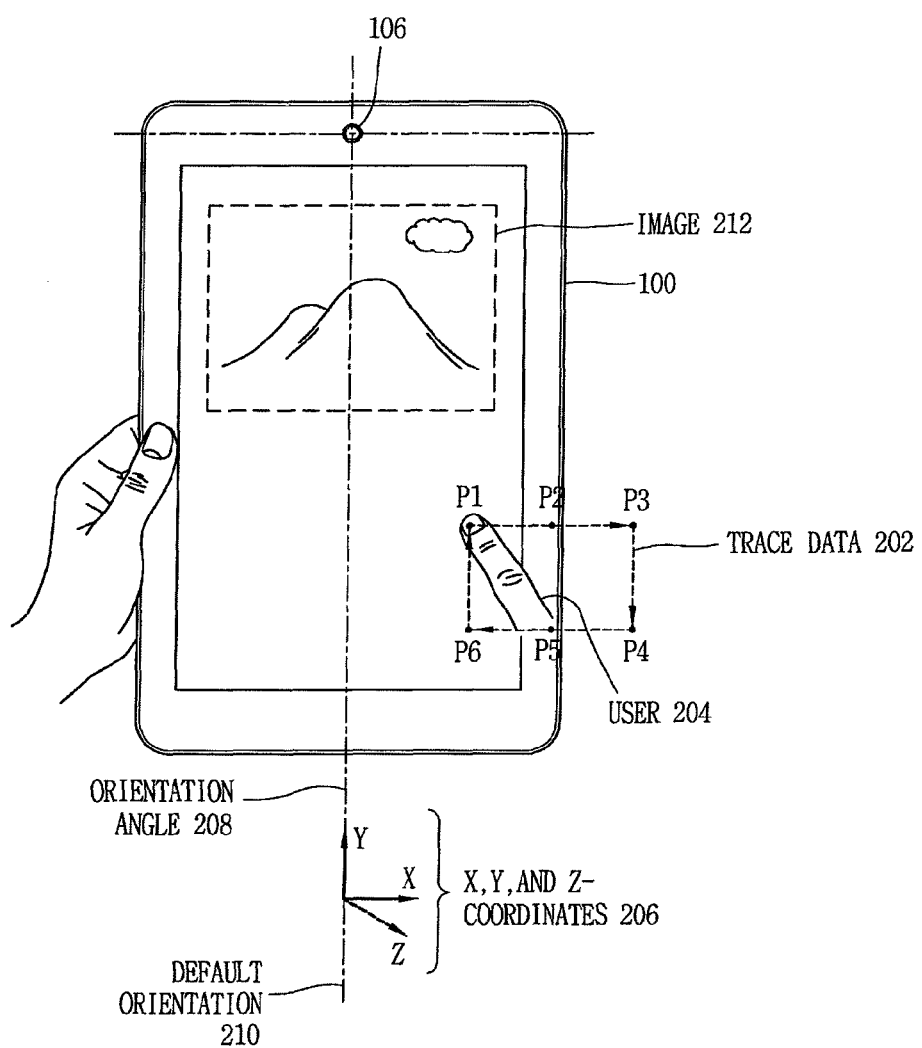

FIGS. 2A and 2B illustrate an exemplary view of the mobile device 100 of FIG. 1 in a first orientation for recognizing a gesture, according to one embodiment of the present invention. In FIG. 2A, the controller 110 of FIG. 1 is configured to generate trace data 202 which correspond to a gesture forming a rectangle when the gesture is captured by the camera 106 as a user 204 of the mobile device 100 moves the user's finger to form the rectangle. During the generation of the trace data 202, x, y, and z coordinates 206 of the trace data 202 are applied according to an orientation of the housing 102 during the gesture. In FIG. 2A, the y-coordinate of the trace data 202 is formed along the line crossing the camera 106 in lengthwise direction (e.g., the North-South direction) of the mobile device 100. It is appreciated that although six data points P1 through P6 are presented as the trace data 202, there could be more or less than the six data points forming the trace data 202. That is, the rectangle of the trace data 202 may be a circle, oval, triangle or other regular or irregular polygon or shape. Also, the shape may be a completely closed shape or may be a partially closed shape.

Before, during or after receiving the trace data 202, the controller 110 is configured to determine an orientation angle 208 of the housing 102 detected by the orientation sensor 104, where the orientation angle 208 is obtained by measuring the angle between a line crossing the camera 106 in lengthwise direction of the housing 102 in the orientation taken by the mobile device 100 during the gesture and a straight line crossing the camera 106 in lengthwise direction of the housing 202 in a default orientation 210 (e.g., the portrait orientation where the camera 106 is located at the top center of the mobile device 100). That is, the orientation angle is obtained by measuring an angle between a straight line crossing the camera in a lengthwise direction of the housing and a straight line crossing the camera in a widthwise direction of the housing. Thus, if a default orientation in FIG. 2A is a portrait orientation, the orientation angle 208 of zero (0) degrees is obtained. Upon determining the orientation angle 208, the controller 110 is configured to recognize the gesture through accessing a lookup table stored in the memory 108 of the mobile device 100 based on the trace data 202 and the orientation angle 208 of the housing 102.

FIG. 2B illustrates a table 250 listing exemplary coordinates of the trace data 202 in FIG. 2A. In the table 250, x-coordinate 252 and y-coordinate 254 of P1, P2, P3, P4, P5, and P6 are listed as (8, 5), (11, 5), (13, 5), (13, 3), (11, 3), and (8, 3), respectively, thus forming a shape of a rectangle with its length extending along the widthwise direction of the mobile device 100 and its width extending along the lengthwise direction of the mobile device 100, and being interpreted by the controller 110 as the gesture of forming a rectangle with the length of the rectangle extending along the x-axis of the x, y and z-coordinates 206.

Figure 3A:
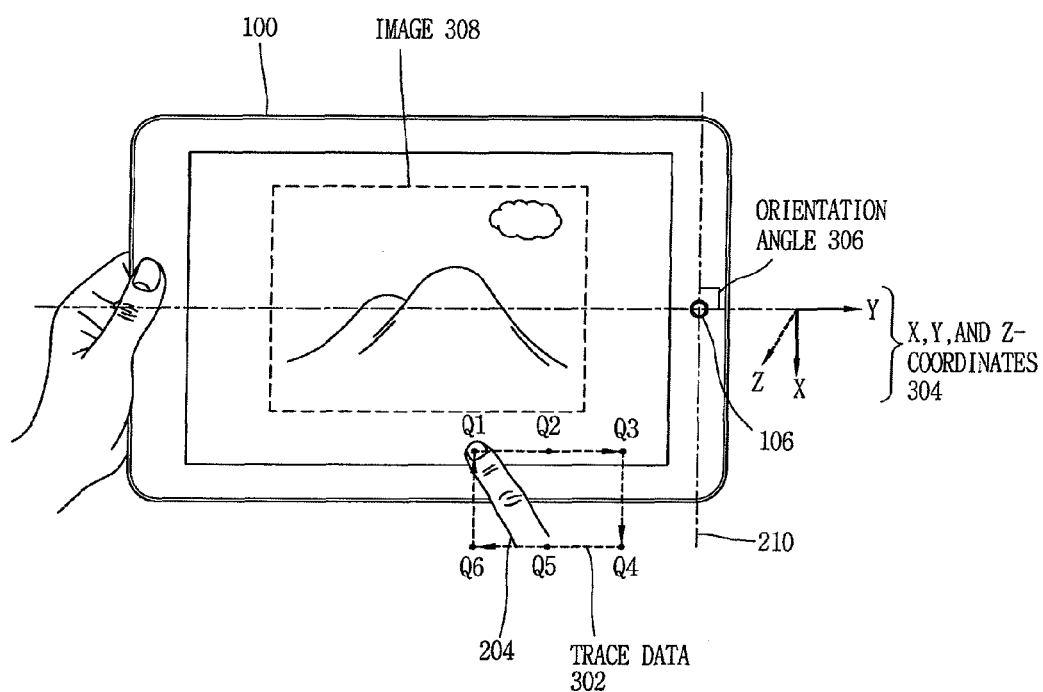

FIGS. 3A and 3B illustrate an exemplary view of the mobile device 100 of FIG. 1 in a second orientation for recognizing a gesture, according to one embodiment of the present invention. In FIG. 3A, the controller 110 of FIG. 1 is configured to generate trace data 302 which correspond to a gesture forming a rectangle when the gesture is captured by the camera 106 as the user 204 of the mobile device 100 moves the user's finger to form the rectangle. During the generation of the trace data 302, x, y, and z coordinates 304 of the trace data 302 are applied according to an orientation of the housing 102 during the gesture. In FIG. 3A, the y-coordinate of the trace data 302 is formed along the line crossing the camera 106 in lengthwise direction of the mobile device 100. It is appreciated that although six data points Q1 through Q6 are presented as the trace data 302, there could be more or less than the six data points forming the trace data 302. That is, the rectangle of trace data 302 may be a circle, oval, triangle or other regular or irregular polygon or shape. Also, the shape may be a completely closed shape or may be a partially closed shape.

Before, during or after receiving the trace data 302, the controller 110 is configured to determine an orientation angle 306 of the housing 102 detected by the orientation sensor 104, where the orientation angle 306 is obtained by measuring the angle between the line crossing the camera 106 in lengthwise direction of the housing 102 in the orientation taken by the mobile device 100 during the gesture and a straight line crossing the camera 106 in the lengthwise direction of the housing 102 in the default orientation 210 (e.g., the portrait orientation where the camera 106 is located at the top center of the mobile device 100 as in FIG. 2A). Thus, in FIG. 3A, the orientation angle 306 of ninety (90) degrees is obtained. Upon determining the orientation angle 306, the controller 110 is configured to recognize the gesture through accessing the lookup table stored in the memory 108 of the mobile device 100 based on the trace data 302 and the orientation angle 306 of the housing 102.

FIG. 3B illustrates a table 350 listing exemplary coordinates of the trace data 302 in FIG. 3A. In the table 350, x-coordinate 352 and y-coordinate 354 of Q1, Q2, Q3, Q4, Q5, and Q6 are listed as (9, 9), (9, 11), (9, 13), (11, 13), (11, 11), and (11, 9), respectively, thus forming a shape of a rectangle with its length extending along the lengthwise direction of the mobile device 100 and its width extending along the widthwise direction of the mobile device 100, and being interpreted as a gesture of forming a rectangle with the length of the rectangle extending along the y-axis of the x, y, and z-coordinates 304. Therefore, the rectangle or the trace data 302 formed in FIG. 3A is interpreted different from the rectangle or the trace data 202 formed in FIG. 2A if the interpretation is based solely on the trace data 202 or 302 according to the different coordinates (e.g., the x, y, z-coordinates 206 for the mobile device 100 in the portrait orientation and the x, y, z-coordinates 304 for the mobile device 100 in the landscape orientation) employed by the mobile device in the different orientations, although the user 204 may use the same gesture to form the trace data 202 and the trace data 302.

Figure 4:
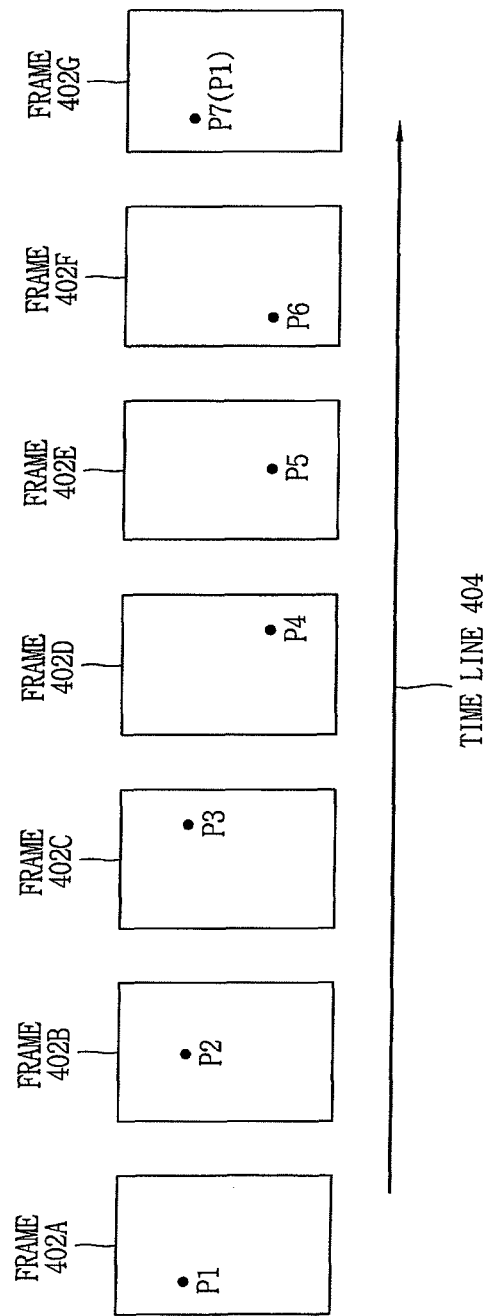
FIG. 4 illustrates an exemplary view of the trace data in FIG. 2A captured by the mobile device of FIG. 1, according to one embodiment of the present invention.

FIG. 4 illustrates an exemplary view of the trace data 202 in FIG. 2A captured by the mobile device 100 of FIG. 1, according to one embodiment of the present invention. In FIG. 4, the trace data 202 may be generated by the camera 106 by capturing multiple frames 402A through 402G from an initial instance of the gesture to a final instance of the gesture. The multiple frames 402A through 402G may represent positions of the finger in the x, y, z-coordinates 206 captured along a time line 404, where P1 represents a position of the user's finger at the initial instance of the capture by the camera 106 and P7 represents a position of the user's finger at the final instance of the capture by the camera 106. It is appreciated that P7 may coincide with the coordinates of P1 to complete the formation of the rectangle.

As the trace data 202 are captured by the camera 106, the x, y, and z-coordinates of the trace data 202 may be determined by the controller 110. For example, as illustrated in FIG. 2B, (8, 5), (11, 5), (13, 5), (13, 3), (11, 3), and (8, 3) may be identified as the x, y, and z coordinates of P1 or P7, P2, P3, P4, P5, and P6, respectively.

Figure 5:
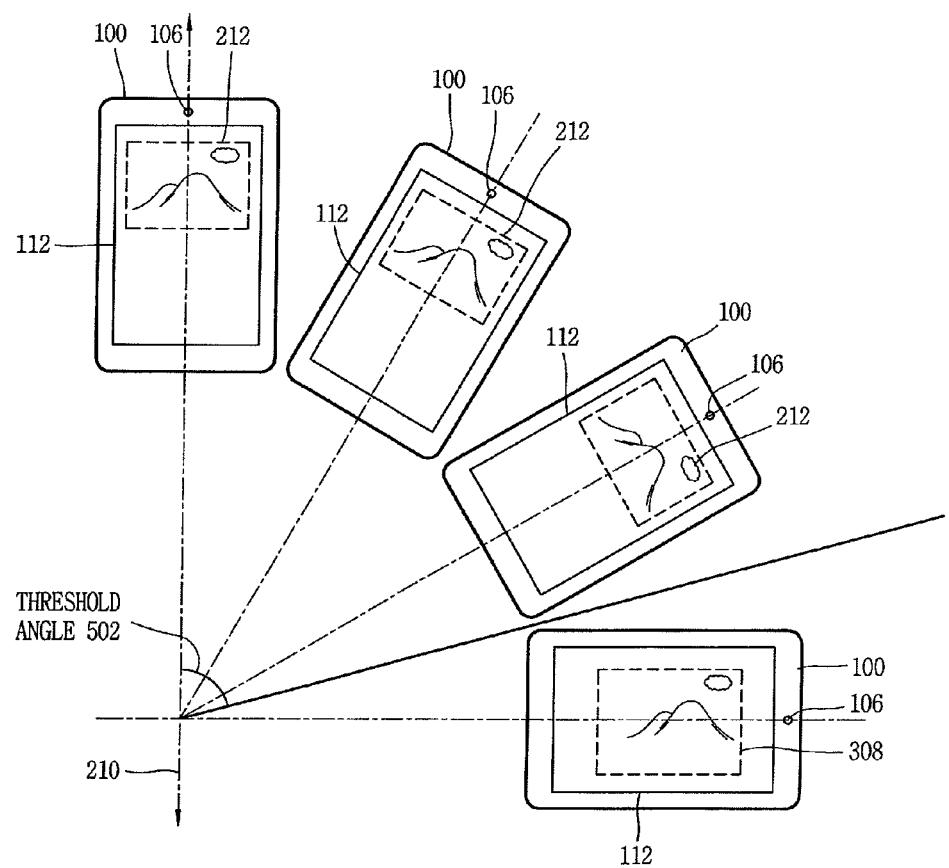
FIG. 5 illustrates an exemplary view of the mobile device of FIG. 1 in two different orientations displaying an image accordingly, according to one embodiment of the present invention.

FIG. 5 illustrates an exemplary view of the mobile device 100 of FIG. 1 in two different orientations displaying an image accordingly, according to one embodiment of the present invention. In FIG. 5, the image 212 is displayed on the display unit 112 of the mobile device 100 in a portrait orientation so long as the orientation angle of the housing 102 or the mobile device 100 is less than a threshold angle 502, whereas image 212 is displayed on the display unit 112 in a landscape orientation when the orientation angle of the housing is greater than the threshold angle.

More particularly, in FIG. 5, the orientation angle of the mobile device 100 in the first, second, and third instance is less than the threshold angle 502 (e.g., less than 15 degrees), so the mobile device 100 maintains its portrait orientation for each of the three instances. Accordingly, the image 212 is displayed on the display unit 112 in the portrait orientation. Conversely, when the orientation angle of the mobile device 100 in the fourth instance is detected by the orientation sensor 104 to be greater than the threshold angle 502, the mobile device 100 shifts to the landscape orientation. Accordingly, the image 308 is displayed on the display unit 112 in the landscape orientation.

Figure 6:
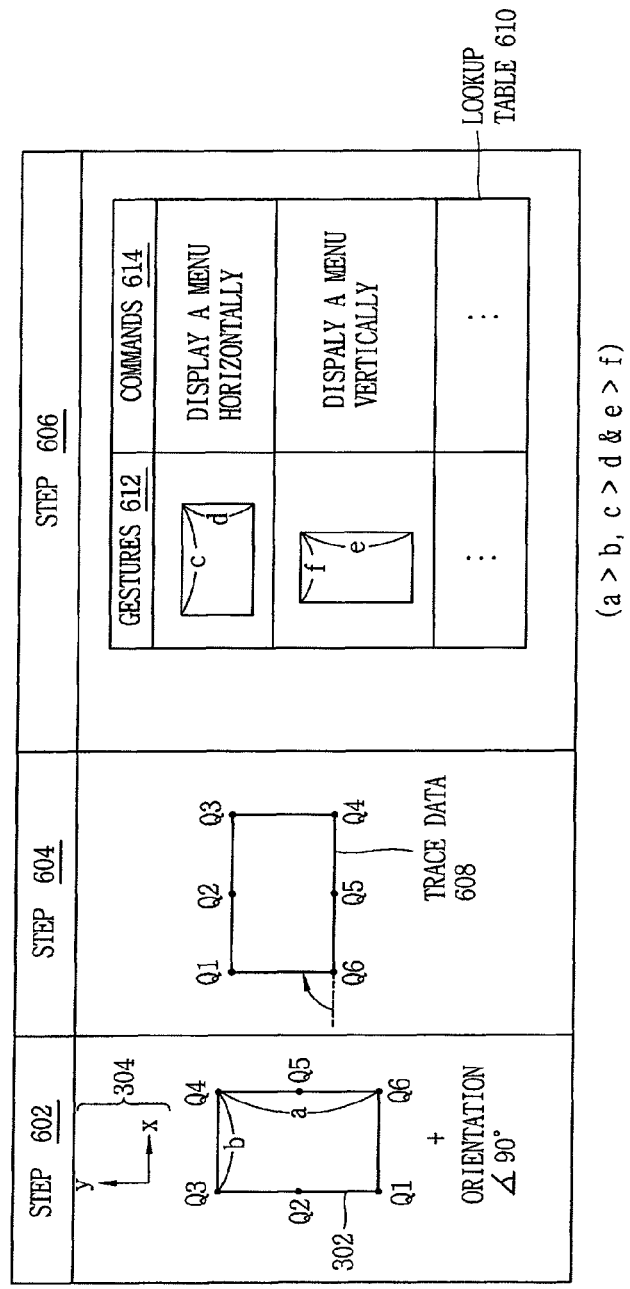
FIG. 6 illustrates an exemplary process of the mobile device in FIG. 1 for recognizing the gesture, according to one embodiment of the present invention.

FIG. 6 illustrates an exemplary process of the mobile device 100 in FIG. 1 for recognizing the gesture, according to one embodiment of the present invention. In step 602, the trace data 302 and the orientation angle of ninety (90) degrees are processed, where the length of the shape of the trace data 302, i.e., the rectangle, is along the y-axis of the x, y, and z-coordinates 304. However, in step 604, the controller 110 of the mobile device 100 generates a trace data 608 through applying ninety (90) degrees of the orientation angle associated with the trace data 302.

As a result, the gesture, which generates the trace data 608, i.e., the trace data 302 applied with the ninety degree orientation angle, are interpreted by the controller 110 as the gesture which corresponds to the command for displaying a menu horizontally. The identification of the gesture is performed by accessing a lookup table 610 which include multiple gestures 612 and respective commands 614. Thus, from the lookup table 610, the trace data 302 and the ninety degree orientation angle are processed to identify the gesture in a shape of a rectangle with its length 'c' extending horizontally, rather than the gesture in a shape of a rectangle with its length 'e' extending vertically.

Figure 7:
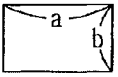
FIG. 7 illustrates another exemplary process of the mobile device in FIG. 1 for recognizing the gesture, according to one embodiment of the present invention.
Figure 7:
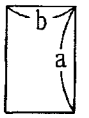
Figure 7:
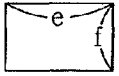
Figure 7:
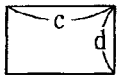
Figure 7:
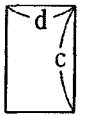
Figure 7:
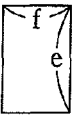

FIG. 7 illustrates another exemplary process of the mobile device 100 in FIG. 1 for recognizing the gesture, according to one embodiment of the present invention. As illustrated in FIG. 1, the memory 108 may include a lookup table 702 which may be accessed to identify the gesture associated with the trace data 202 or the trace data 302. In FIG. 7, the lookup table 702 comprises multiple combinations of a trace data 704 and an orientation angle 706 and a gesture 708 associated with each combination as well as a command 710 which corresponds to the gesture 708.

In FIG. 2A, the gesture performed to the mobile device 100 in the portrait orientation results in the trace data 202, i.e., a shape of a rectangle with its length 'a' extending horizontally, and the zero (0) degree orientation angle. Through accessing the lookup table 702 based on the trace data 202 and the zero degree orientation angle, the gesture in the shape of a rectangle with its length 'e' extending horizontally is obtained, and the command is executed to 'display a main menu horizontally.'

In FIG. 3A, the gesture performed to the mobile device 100 in the landscape orientation results in the trace data 302, i.e., a shape of a rectangle with its length 'a' extending vertically, and the ninety (90) degree orientation angle. Through accessing the lookup table 702 based on the trace data 302 and the ninety degree orientation angle, the gesture in the shape of a rectangle with its length 'e' extending horizontally is obtained, and the command is executed to 'display a main menu horizontally.' Thus, the same gesture applied to the mobile device 100 in the two different orientations, as in FIG. 2A and FIG. 3A, is interpreted in the same manner by the mobile device 100 regardless of its orientation.

Figure 8:
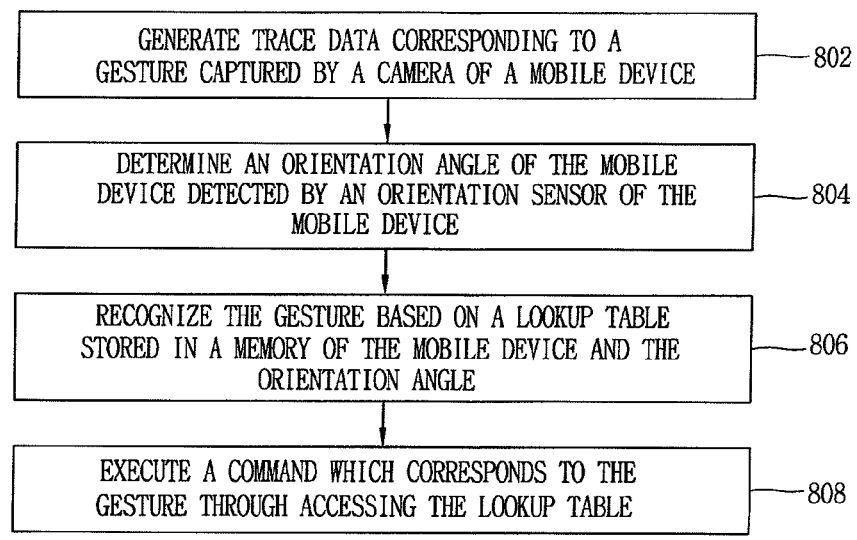
FIG. 8 illustrates a process flow chart of an exemplary process performed by the mobile device in FIG. 1 for recognizing a gesture, according to one embodiment of the present invention.

FIG. 8 illustrates a process flow chart of an exemplary process performed by the mobile device 100 in FIG. 1 for recognizing a gesture, according to one embodiment of the present invention. In keeping with the previous examples, particular components described with respect to FIG. 1 through FIG. 7 are referenced as performing the process in FIG. 8. It should be noted that the components that are referred to as performing the process are for illustrative purposes only. In some implementations, other components, or a different combination of components within a system or device, may instead perform the process in FIG. 8.

In operation 802, as illustrated in FIG. 2A and FIG. 3A, the trace data 202 or 302 corresponding to a gesture captured by the camera 106 of the mobile device 100 are generated. In one embodiment of the present invention, the image data 212 is displayed on the display unit 112 in the portrait orientation when the orientation angle 208 of the housing 102 is less than the threshold angle, whereas the image data 308 is displayed on the display unit 112 in the landscape orientation when the orientation angle 306 of the housing 102 is greater than the threshold angle. In one embodiment of the present invention, the trace data 202 or 302 is generated by capturing multiple frames 402A through 402G from the initial instance of the gesture to the final instance of the gesture using the camera 106 and determining the x, y, and z coordinates of the trace data 202 or 302 from the frames 402A through 402G.

Then, in operation 804, the orientation angle 208 or 306 of the mobile device 100 is detected by the orientation sensor 104 of the mobile device 100. In addition, in operation 806, the gesture is recognized (e.g., identified) based on the lookup table 610 or 702 stored in the memory 108 of the mobile device 100. In one embodiment of the present invention, a shape of the trace data 202 or 302 is generated by connecting the trace data 202 or 302 according to temporal data of the trace data 202 or 302, rotating the shape of the trace data 202 or 302 by the orientation angle 208 or 306, and locating the gesture when there is a match between the shape of the trace data 202 or 302 and one of the gestures in the lookup table 610 or 702. Further, in operation 808, a command which corresponds to the gesture is executed through accessing the lookup table 610 or 702.

It is appreciated that the methods disclosed in FIG. 8 may be implemented in a form of a machine-readable medium embodying a set of instructions that, when executed by a machine, cause the machine to perform any of the operations disclosed herein. Also, steps 802 and 804 may be reversed or may occur concurrently.

FIGS. 9A-9D illustrate an exemplary view of the mobile device 100 of FIG. 1 for repositioning a pointer 902 in response to a shift in the orientation of the mobile device 100, according to one embodiment of the present invention. In FIGS. 9A-9D, the mobile device 100 comprises the housing 102, the display unit 112, the orientation sensor 104, the camera 106 implemented on the housing 102, and the controller 110 coupled to the display unit 112, the orientation sensor 104, and the camera 106.

Figure 9A:
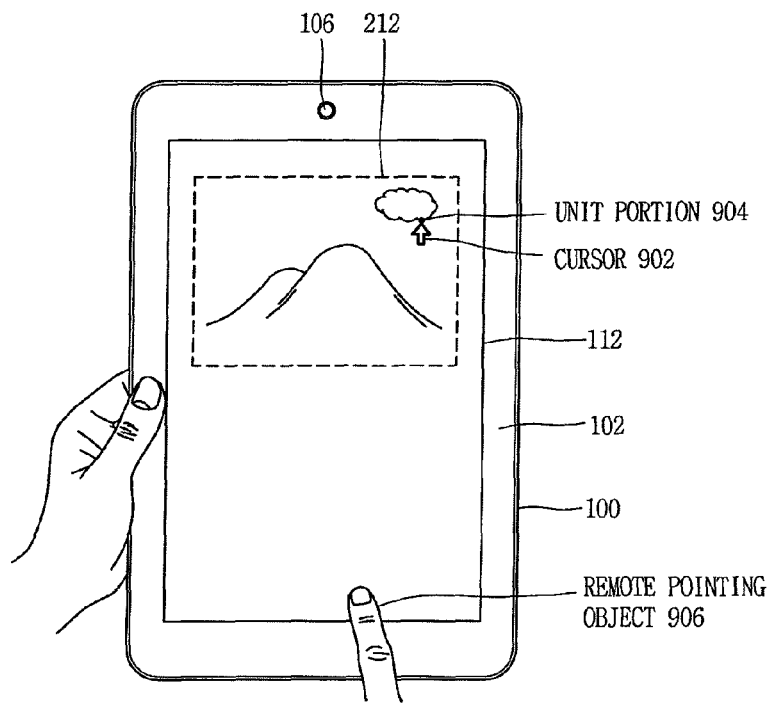
FIGS. 9A-9D illustrate an exemplary view of the mobile device of FIG. 1 for repositioning a pointer in response to a shift in the orientation of the mobile device, according to one embodiment of the present invention.
Figure 9B:
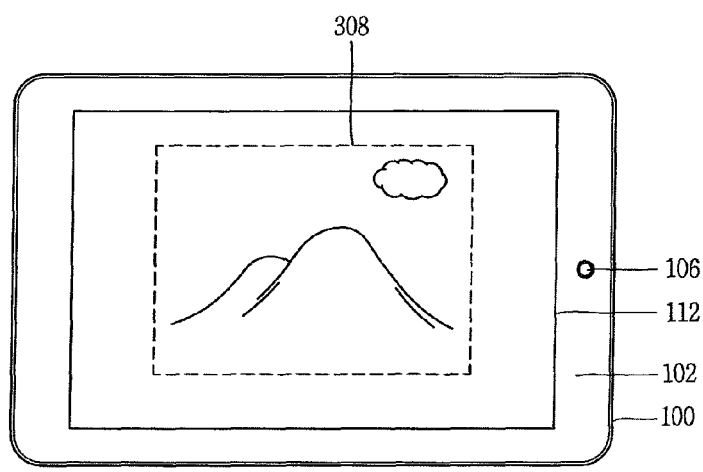

In FIG. 9A, the pointer 902 is placed on a unit portion 904 of the image 212 displayed on the display unit 112 in response to a capture by the camera 106 of a remote pointing object 906 (e.g., a finger or a stylus) pointing to the unit portion 904 on the display unit 112, where the image 212 is displayed on the display unit 112 according to a first orientation (e.g., the portrait orientation). In FIG. 9B, the image 308 is displayed on the display unit 112 according to a second orientation (e.g., the landscape orientation) when the orientation of the housing 102 detected by the orientation sensor 104 indicates a shift to the second orientation by the mobile device 100.

In one embodiment of the present invention, the unit portion 904 of the image 212 may be flagged or tagged with metadata immediately prior to the shift of the orientation of the mobile device 100 from the first orientation to the second orientation. In one exemplary implementation, the unit portion 904 of the image 212 may be flagged or tagged with metadata indicating the position of the pointer 902 on the image 212 which coincides with the unit portion 904 if any inclination by the mobile device 100 beyond a threshold value (e.g., an inclination angle beyond which indicates the start of an operation shifting the orientation of the mobile device 100, such as five (5) degrees) is detected by the orientation sensor 104. In one exemplary implementation, the mobile device 100 may not recognize or process any input (e.g., the remote pointing object 906) while the mobile device 100 is in transition from the portrait orientation to the landscape orientation, thus reducing any error which may occur during the transition. For example, an internal accelerometer or other device may generate an input disable signal upon detecting that the mobile device 100 is in transition from the portrait orientation to the landscape orientation.

Once the mobile device 100 completes the transition to the landscape orientation, the metadata (e.g., the flag, tag, etc.) indicating the position of the pointer 902, which previously pointed to the unit portion 904 on the image 212, is accessed and located. Then, in FIG. 9C, new coordinates of the unit portion 908 are obtained based on the metadata. Then, in FIG. 9D, the pointer 902 pointing to the same unit portion 904 of the image 212 is repositioned and displayed on the image 308. It is appreciated that the size of the image 308 and the proportion of the length and width for the image 212 may differ from the size of the image 212 and the proportion of its length and width, respectively. Accordingly, the pointer in FIG. 9D may be repositioned according to the modification of the image 308 from the image 212.

FIGS. 10A-10D illustrate an exemplary view of a mobile device 1002 in different configuration than the mobile device 100 of FIG. 1 for repositioning a pointer 1010 in response to a shift of its orientation, according to one embodiment of the present invention. In FIGS. 10A-10D, the mobile device 1002 comprises a housing 1004, a camera 1006, a display unit 1008, an orientation sensor, and a controller coupled to the display unit 1008, the orientation sensor, and the camera 1006.

Figure 10A:
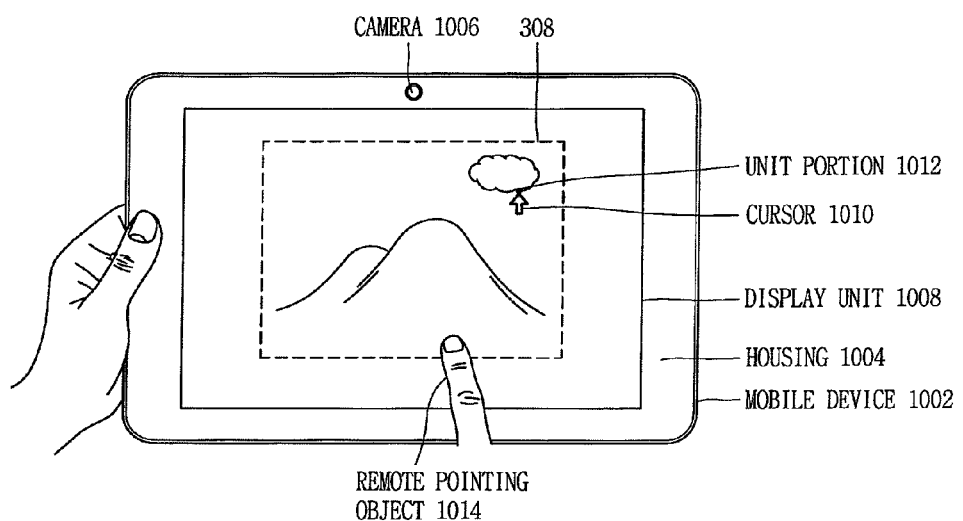
FIGS. 10A-10D illustrate an exemplary view of a mobile device in a different configuration than the mobile device of FIG. 1 for repositioning a pointer in response to a shift in the orientation of the mobile device, according to one embodiment of the present invention.

In FIG. 10A, the pointer 1010 is placed on a unit portion 1012 of the image 308 displayed on the display unit 1008 in response to a capture by the camera 1006 of a remote pointing object 1014 (e.g., a finger) pointing to the unit portion 1012 on the image 308 on the display unit 1008, where the image 308 is displayed on the display unit 1008 according to a first orientation (e.g., the landscape orientation). It is appreciated that for the mobile device 1002 with its camera implemented at the center of the mobile device 1002 along its length, the landscape orientation is set as the default orientation.

Figure 10B:
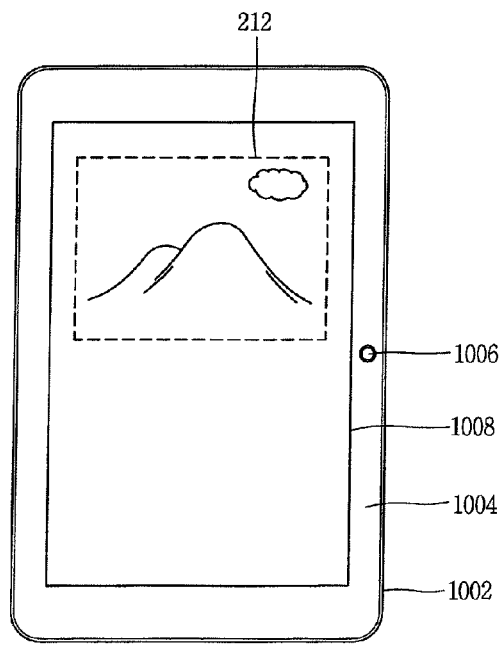

In FIG. 10B, the image 212 is displayed on the display unit 1008 according to a second orientation (e.g., the portrait orientation) when the orientation of the housing 1004 detected by the orientation sensor indicates a shift to the second orientation by the mobile device 1002. In one embodiment of the present invention, the unit portion 1012 of the image 308 may be flagged or tagged with metadata immediately prior to the shift of the orientation of the mobile device 1002 from the first orientation to the second orientation. In one exemplary implementation, the unit portion 1012 of the image 308 may be flagged or tagged with metadata indicating the position of the pointer 1010 on the image 308 if any inclination by the mobile device 1002 beyond a threshold value (e.g., five (5) degrees) is detected by the orientation sensor. In one exemplary implementation, the mobile device 1002 may not recognize or process any input (e.g., the remote pointing object 1014) while the mobile device 1002 is in transition from the portrait orientation to the landscape orientation. For example, an internal accelerometer or other device may generate an input disable signal upon detecting that the mobile device 100 is in transition from the portrait orientation to the landscape orientation.

Once the mobile device 1002 completes the transition to the portrait orientation, the metadata (e.g., the flag, tag, etc.) indicating the position of the pointer 1010, which previously pointed to the unit portion 1012 on the image 308, is accessed and located. Then, in FIG. 10C, new coordinates of the unit portion 1016 are obtained based on the metadata. Then, in FIG. 10D, the pointer 1010 pointing to the same unit portion 1012 of the image 308 is repositioned and displayed on the image 212. It is appreciated that the size of the image 308 and the proportion of its length and width may differ from the size of the image 212 and the proportion of the length and width of the image 212, respectively. Accordingly, the pointer in FIG. 10D may be repositioned according to the modification of the image 212 from the image 308.

Figure 10C:
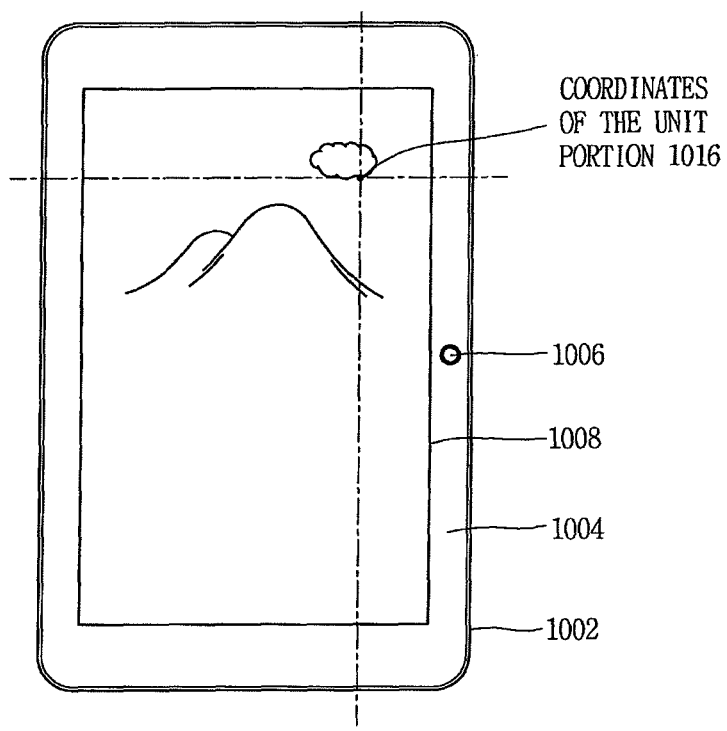
Figure 10D:
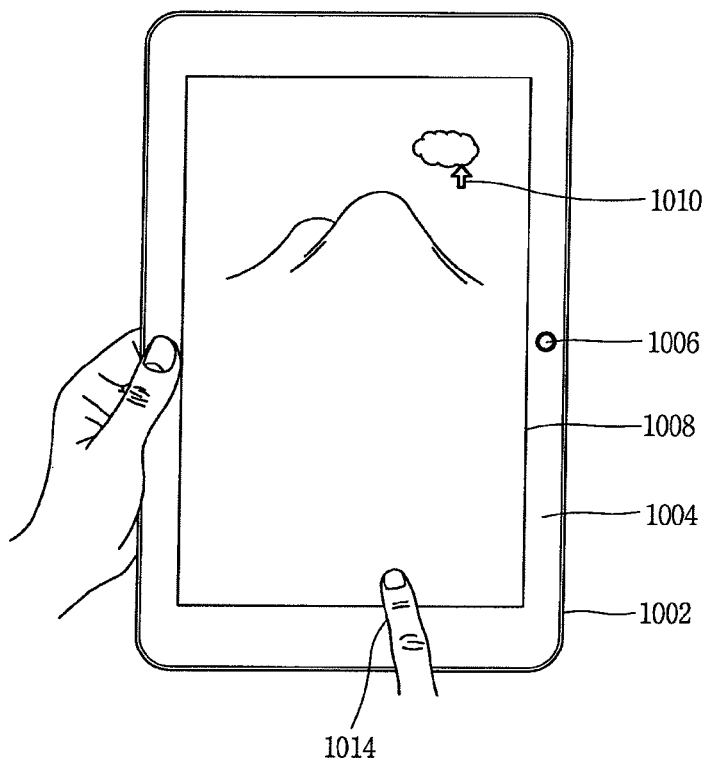
Figure 11:
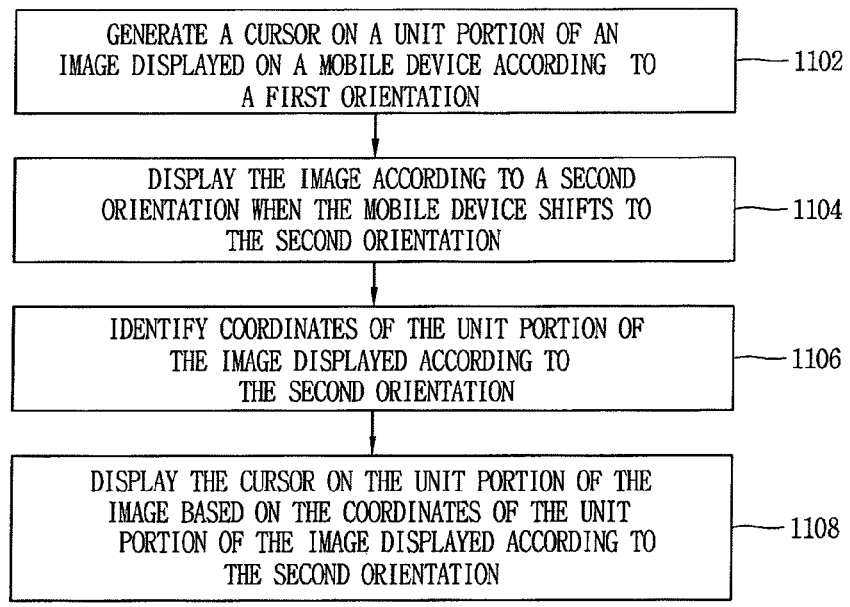
FIG. 11 illustrates a process flow chart of an exemplary process performed by the mobile device in FIG. 1 for repositioning a pointer, according to one embodiment of the present invention.

FIG. 11 illustrates a process flow chart of an exemplary process performed by the mobile device 100 in FIG. 1 for positioning a pointer, according to one embodiment of the present invention. In keeping with the previous examples, particular components described with respect to FIG. 9A through FIG. 10D are referenced as performing the process in FIG. 11. It should be noted that the components that are referred to as performing the process are for illustrative purposes only. In some implementations, other components, or a different combination of components within a system or device, may instead perform the process in FIG. 11.

In operation 1102, as illustrated in FIG. 9A, the pointer 902 on the unit portion 904 of the image 212 is displayed on the mobile device 100 in the first orientation (e.g., the portrait orientation). In operation 1102, as illustrated in FIG. 10A, the pointer 1010 on the unit portion 1012 of the image 308 is displayed on the mobile device 1002 in the first orientation (e.g., the landscape orientation).

Then, in operation 1104, as illustrated in FIG. 9B, the image 308 according to the second orientation (i.e., the landscape orientation) is displayed when the mobile device 100 shifts to the second orientation. In one embodiment of the present invention, the unit portion 904 of the image 212 may be flagged or tagged with metadata immediately prior to the shift of the orientation of the mobile device 100 from the first orientation to the second orientation. In one exemplary implementation, the unit portion 904 of the image 212 may be flagged or tagged with metadata indicating the position of the pointer 902 on the image 212 if any inclination by the mobile device 100 beyond a threshold value (e.g., five (5) degrees) is detected by the orientation sensor 104. In one exemplary implementation, the mobile device 100 may not recognize or process any input (e.g., the remote pointing object 906) while the mobile device 100 is in transition from the portrait orientation to the landscape orientation.

In operation 1104, as illustrated in FIG. 10B, the image 212 according to the second orientation (i.e., the portrait orientation) is displayed when the mobile device 1002 shifts to the second orientation. In one embodiment of the present invention, the unit portion 1012 of the image 308 may be flagged or tagged with metadata immediately prior to the shift of the orientation of the mobile device 1002 from the first orientation to the second orientation. In one exemplary implementation, the unit portion 1012 of the image 308 may be flagged or tagged with metadata indicating the position of the pointer 1010 on the image 308 if any inclination by the mobile device 1002 beyond a threshold value (e.g., five (5) degrees) is detected by the orientation sensor 104. In one exemplary implementation, the mobile device 1002 may not recognize or process any input (e.g., the remote pointing object 1014) while the mobile device 1002 is in transition from the portrait orientation to the landscape orientation.

Figure 9C:
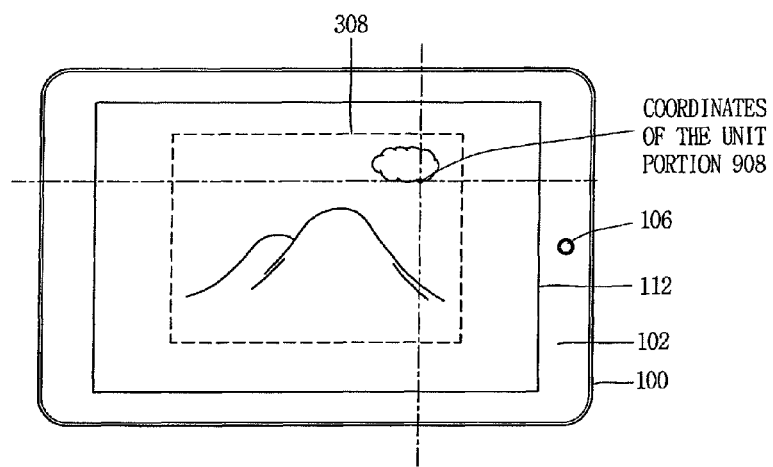
Figure 9D:
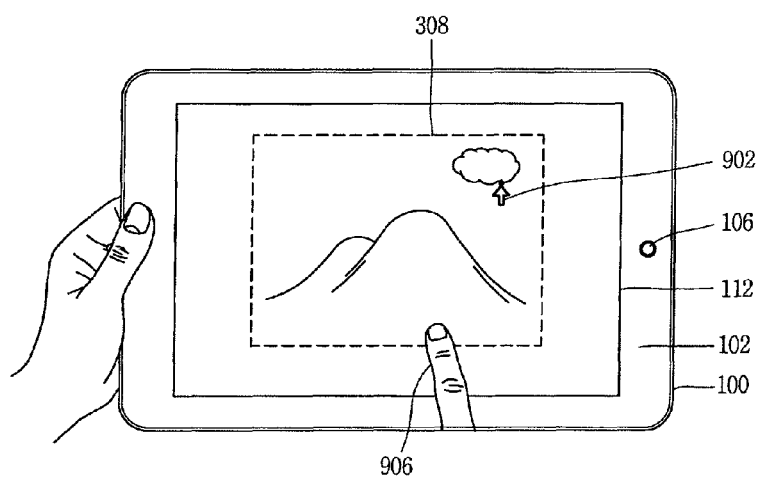

In addition, in operation 1106, as illustrated in FIG. 9C, the coordinates of the unit portion 908 of the image 308 are displayed according to the second orientation. In operation 1106, as illustrated in FIG. 10C, the coordinates of the unit portion 1016 of the image 212 are displayed according to the second orientation. In operation 1108, as illustrated in FIG. 9D, the pointer 902 is displayed on the unit portion 904 of the image 308 based on the coordinates of the unit portion 908 of the image 308 displayed according to the second orientation. In operation 1106, as illustrated in FIG. 10D, the pointer 1010 is displayed on the unit portion 1012 of the image 212 based on the coordinates of the unit portion 1016 of the image 212 displayed according to the second orientation.

It is appreciated that the methods disclosed in FIG. 11 may be implemented in a form of a machine-readable medium embodying a set of instructions that, when executed by a machine, cause the machine to perform any of the operations disclosed herein. Also, steps 1102 and 1104 may be reversed or may occur concurrently.

FIGS. 12A-12E illustrate another exemplary view of the mobile device 100 of FIG. 1 for repositioning a pointer 1202 in response to a shift in the orientation of the mobile device 100, according to one embodiment of the present invention. In FIGS. 12A-12E, the mobile device 100 comprises the housing 102, the orientation sensor 104, the camera 106 implemented on the housing 102, the display unit 112, and the controller 110 coupled to the orientation sensor 104, and the camera 106, and the display unit 112.

Figure 12A:
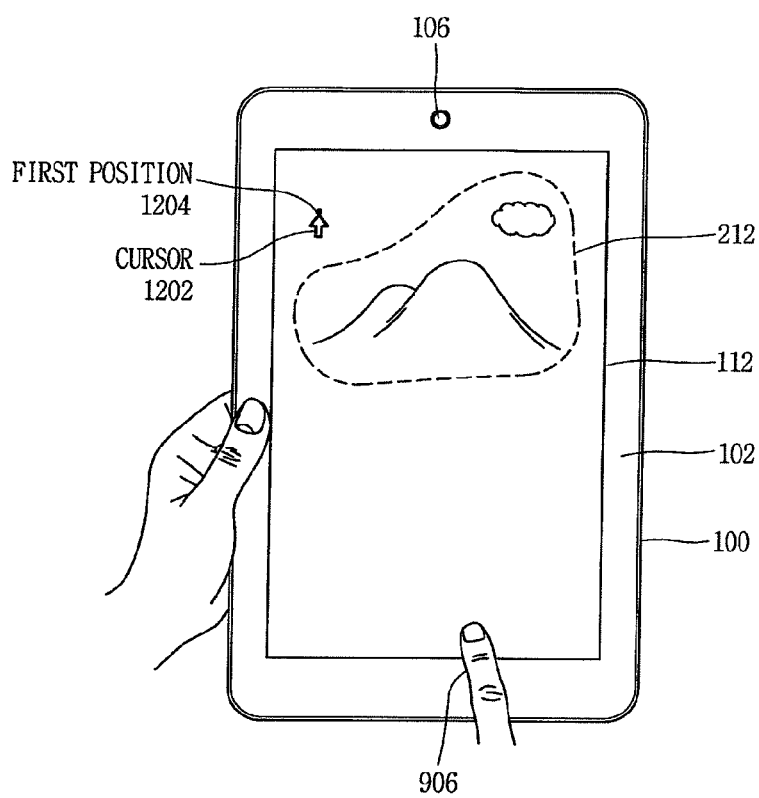
FIGS. 12A-12E illustrate another exemplary view of the mobile device of FIG. 1 for repositioning a pointer in response to a shift in the orientation of the mobile device, according to one embodiment of the present invention.

In FIG. 12A, the pointer 1202 on a first position 1204 proximate to the image 212 displayed on the display unit 112 is generated in response to a capture by the camera 106 of the remote pointing object 906 pointing to the first position 1204 on the display unit 112, where the image 212 is displayed on the display unit 112 according to a first orientation (e.g., the portrait orientation).

Figure 12B:
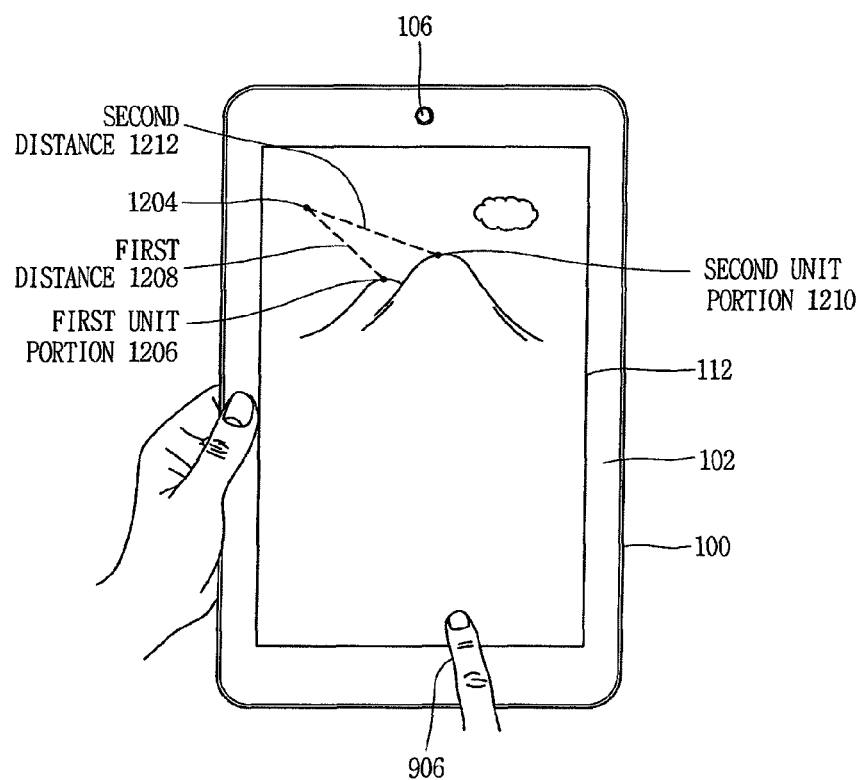
Figure 12C:
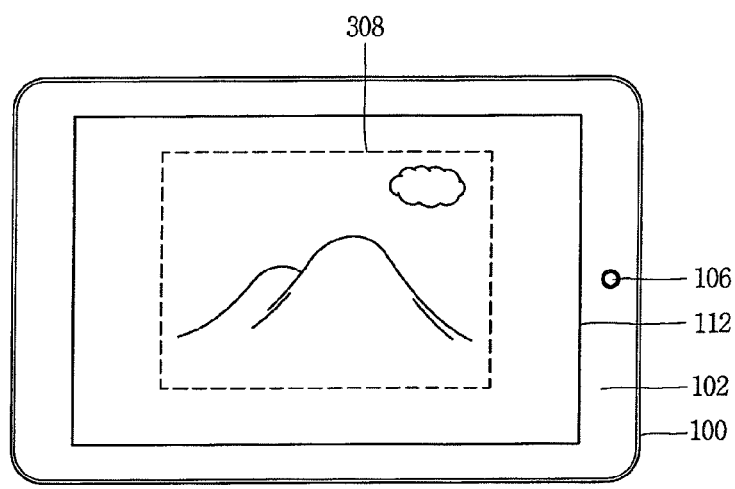

In FIG. 12B, a first distance 1208 between the first position 1204 and a first unit portion 1206 on the image 212 and a second distance 1212 between the first position 1204 and a second unit portion 1210 are measured. It is appreciated that the process of flagging or tagging metadata to each of the first unit portion 1206 and the second unit portion 1210 is similar to the process described for flagging or tagging the metadata to the unit portion 904 in FIG. 9B or 1012 in FIG. 10B. It is also appreciate that more than two distances may be measured, although the measurements of the two distances are illustrated in FIG. 12B. In FIG. 12C, the image 308 is displayed on the display unit 112 according to a second orientation (e.g., the landscape orientation) when the orientation of the housing 102 detected by the orientation sensor 104 indicates a shift to the second orientation by the mobile device 100. In one embodiment of the present invention, the first unit portion 1206 and the second unit portion 1210 of the image 212 may be flagged or tagged with metadata immediately prior to the shift of the orientation of the mobile device 100 from the first orientation to the second orientation. In one exemplary implementation, the first unit portion 1206 and the second unit portion 1210 of the image 212 may be flagged or tagged with metadata indicating their positions with respect to the whole area of the image 212 if any inclination by the mobile device 100 beyond a threshold value (e.g., five (5) degrees) is detected by the orientation sensor 104. Further, the first distance 1208 and the second distance 1212 may be stored in the memory 108 of the mobile device 100. In one exemplary implementation, the mobile device 100 may not recognize or process any input (e.g., the remote pointing object 906) while the mobile device 100 is in transition from the first orientation to the second orientation. For example, an internal accelerometer or other device may generate an input disable signal upon detecting that the mobile device 100 is in transition from the portrait orientation to the landscape orientation.

Once the mobile device 100 completes the transition to the landscape orientation, the metadata (e.g., the flag, tag, etc.) indicating the locations of the first unit portion 1206 and the second unit portion 1210 is accessed and located as well as the first distance 1208 and the second distance 1212 from the memory 108. Then, in FIG. 12D, coordinates of the first unit portion 1214 and coordinates of the second unit portion 1216 on the image 308 are obtained based on the metadata. Further, in FIG. 12E, the pointer 1202 is repositioned and displayed on the image 212 based on the coordinates of the first unit portion 1214 and coordinates of the second unit portion 1216 on the image 308 as well as the first distance 1208 and the second distance 1212. It is appreciated that the size of the image 308 and the proportion of its length and width may differ from the size of the image 212 and the proportion of its length and width, respectively. Accordingly, the pointer in FIG. 12E may be repositioned according to the modification from the image 212 to the image 308.

Figure 13:
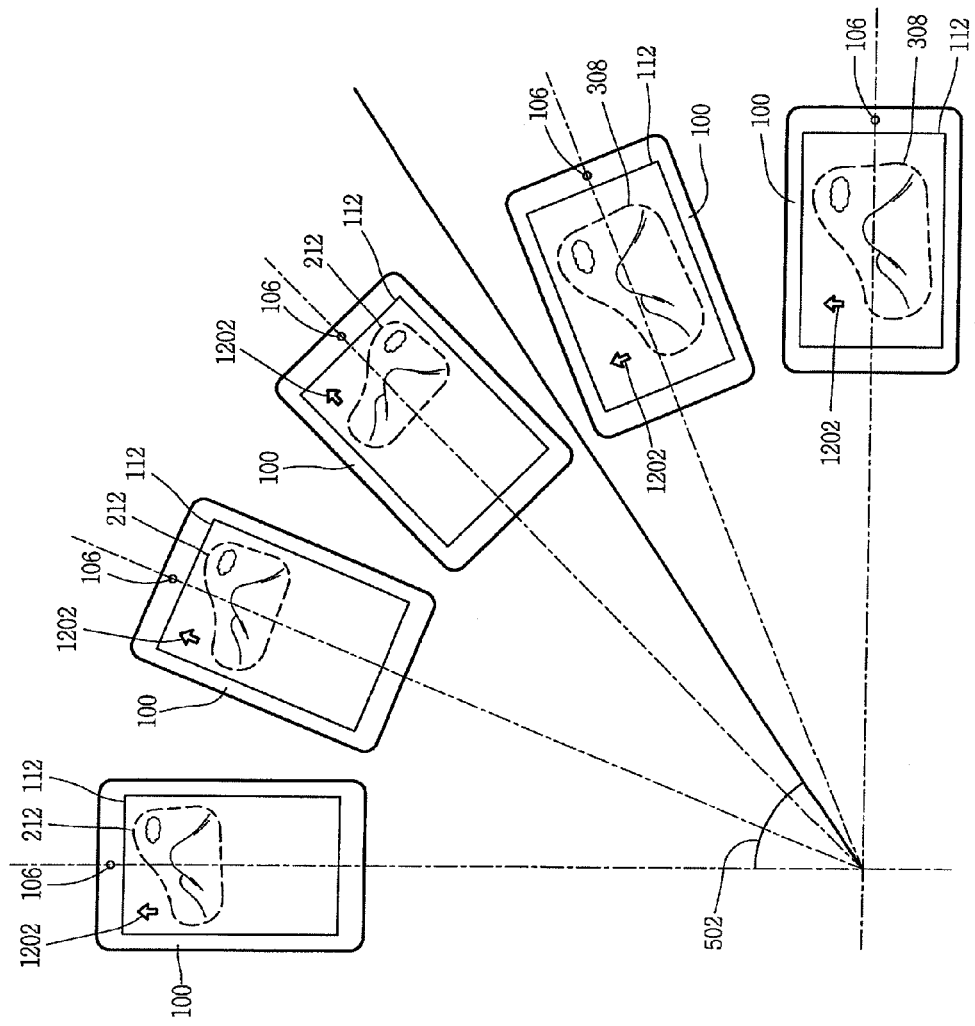
FIG. 13 illustrates an exemplary view of the mobile device of FIG. 1 in different orientations repositioning a pointer in response to a shift in the orientation of the mobile device, according to one embodiment of the present invention.

FIG. 13 illustrates an exemplary view of the mobile device 100 of FIG. 1 in different orientations repositioning a pointer in response to a shift in the orientation of the mobile device 100, according to one embodiment of the present invention. In FIG. 13, the image 212 is displayed on the display unit 112 of the mobile device 100 in the portrait orientation so long as the orientation angle of the housing 102 or the mobile device 100 is less than the threshold angle 502, whereas image 212 is displayed on the display unit 112 in the landscape orientation when the orientation angle of the housing is greater than the threshold angle 502.

More particularly, in FIG. 13, the orientation angle of the mobile device 100 in the first, second, and third instance is less than the threshold angle 502 (e.g., 15 degrees), so the mobile device 100 maintains its portrait orientation for each of the three instances. Accordingly, the image 212 is displayed on the display unit 112 in the portrait orientation. Conversely, when the orientation angle of the mobile device 100 in the fourth and fifth instance is detected by the orientation sensor 104 to be greater than the threshold angle 502, the mobile device 100 shifts to the landscape orientation. Accordingly, the image 308 is displayed on the display unit 112 in the landscape orientation. Further, the pointer 1202 is maintained at the same physical position on the display unit 112 (e.g., the top left corner of the mobile device 100) while the mobile device 100 maintains the portrait orientation, but jumps to the new physical position on the display unit 112 (e.g., the bottom left corner of the mobile terminal 100) upon the shifting of the mobile device 100 to the landscape orientation. However, the position of the pointer 1202 is maintained the same with respect to the image displayed on the display unit 112 (e.g., the image 212 from the portrait orientation and the image 308 for the landscape orientation). It is appreciated the details of the operation for repositioning the pointer 1202 is described in details in FIGS. 12A-12E.

Figure 14:
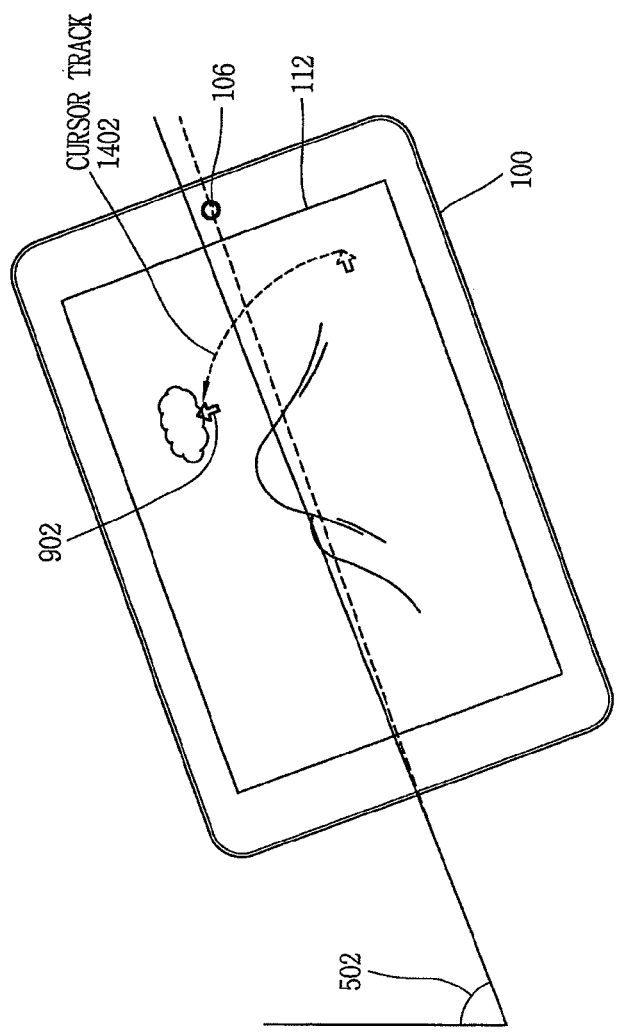
FIG. 14 illustrates an exemplary view of a pointer being repositioned on the display unit in response to a shift in the orientation of the mobile device in FIG. 1, according to one embodiment of the present invention.

FIG. 14 illustrates an exemplary view of the pointer 902 being repositioned on the display unit 112 in response to a shift of the orientation of the mobile device 100 in FIG. 1, according to one embodiment of the present invention. In FIG. 14, the pointer 1202 is maintained while the mobile device 100 maintains the portrait orientation, but jumps to the new position upon the shifting of the mobile device 100 to the landscape orientation, as illustrated in a pointer track 1402 in dotted line. It is appreciated the details of the operation for repositioning the pointer 902 (e.g., or the pointer 1202) is described in details in FIGS. 12A-12E.

Figure 15:
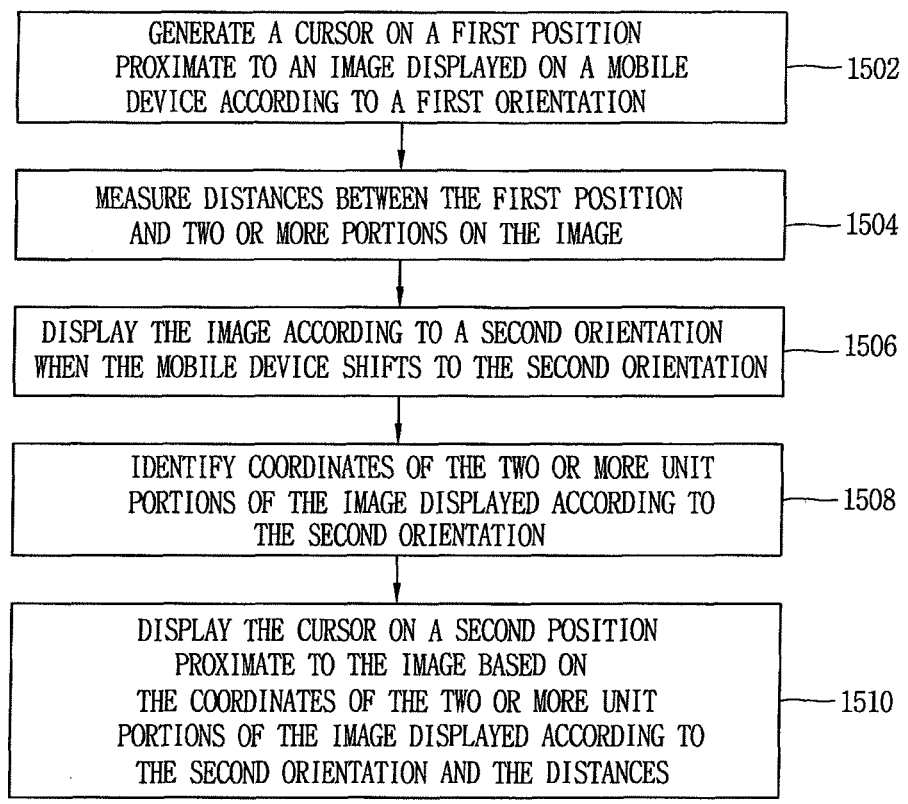
FIG. 15 illustrates a process flow chart of another exemplary process performed by the mobile device in FIG. 1 for repositioning a pointer, according to one embodiment of the present invention.

FIG. 15 illustrates a process flow chart of another exemplary process performed by the mobile device 100 in FIG. 1 for repositioning a pointer, according to one embodiment of the present invention. In keeping with the previous examples, particular components described with respect to FIG. 12A through FIG. 14 are referenced as performing the process in FIG. 15. It should be noted that the components that are referred to as performing the process are for illustrative purposes only. In some implementations, other components, or a different combination of components within a system or device, may instead perform the process in FIG. 15.

In operation 1502, as illustrated in FIG. 12A, the pointer 1202 on the first position 1204 proximate to the image 212 displayed on the display unit 112 is generated and displayed when the camera 106 captures the remote pointing object 906 pointing to the first position 1204 on the display unit 112, where the image 212 is displayed on the display unit 112 in the first orientation (e.g., the portrait orientation). In operation 1504, as illustrated in FIG. 12B, the first distance 1208 between the first position 1204 and the first unit portion 1206 on the image 212 and the second distance 1212 between the first position 1204 and the second unit portion 1210 are measured.

Figure 12D:
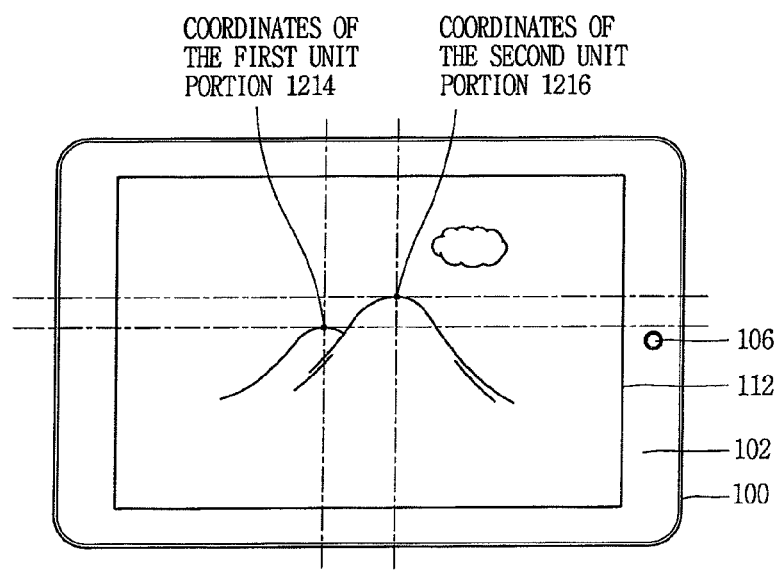
Figure 12E:
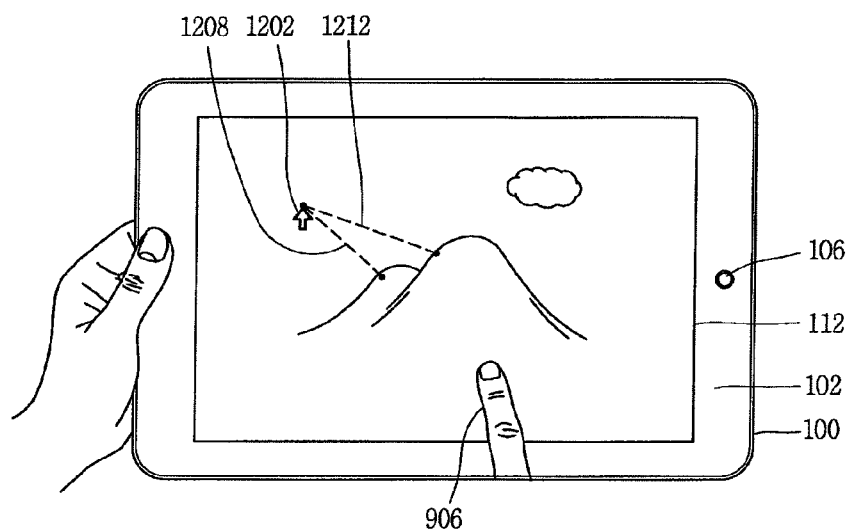

In operation 1506, as illustrated in FIG. 12C, the image 308 is displayed on the display unit 112 according to the second orientation (e.g., the landscape orientation) when the orientation of the housing 102 detected by the orientation sensor 104 indicates a shift to the second orientation by the mobile device 100. In one embodiment of the present invention, the first unit portion 1206 and the second unit portion 1210 of the image 212 may be flagged or tagged with metadata immediately prior to the shift of the orientation of the mobile device 100 from the first orientation to the second orientation. Once the mobile device 100 completes the transition to the landscape orientation, the metadata (e.g., the flag, tag, etc.) indicating the locations of the first unit portion 1206 and the second unit portion 1210 is accessed and located as well as the first distance 1208 and the second distance 1212 from the memory 108. Then, in operation 1508, as illustrated in FIG. 12D, the coordinates of the first unit portion 1214 and the coordinates of the second unit portion 1216 on the image 308 are obtained based on the metadata. Further, in operation 1510, as illustrated in FIG. 12E, the pointer 1202 is repositioned and displayed on the image 212 based on the coordinates of the first unit portion 1214 and coordinates of the second unit portion 1216 on the image 308 as well as the first distance 1208 and the second distance 1212.

It is appreciated that the methods disclosed in FIG. 15 may be implemented in a form of a machine-readable medium embodying a set of instructions that, when executed by a machine, cause the machine to perform any of the operations disclosed herein. Also, operation 1504 may occur after or concurrent with operation 1508.

FIG. 16 illustrates an exemplary view of the mobile device 100 of FIG. 1 in different orientations maintaining the absolute position of a pointer in response to a shift in the orientation of the mobile device 100, according to one embodiment of the present invention. In FIG. 16, the image 212 is displayed on the display unit 112 of the mobile device 100 in the portrait orientation so long as the orientation angle of the housing 102 or the mobile device 100 is less than the threshold angle 502, whereas image 212 is displayed on the display unit 112 in the landscape orientation when the orientation angle of the housing is greater than the threshold angle 502. Further, the pointer 1602 is maintained at its original physical position (e.g., the top left corner) even after the mobile device 100 shift from the portrait orientation to the landscape orientation.

In various embodiments, the systems, circuits and devices described in FIG. 1 through FIG. 16 may enable recognition of a gesture in the same manner by a mobile device regardless of the orientation of the mobile device. In one example, the mobile device may interpret a gesture in the same manner whether it be in the portrait orientation or the landscape orientation by tracing data generated from capturing the gesture and the tilt angle of the mobile device. Further, in another example, the mobile device may reposition a pointer to the same position on an image displayed on the mobile device in the first orientation even after the mobile device shifts to the second orientation and display the image according to the second orientation. This may be achieved by associating the pointer position with the unit portion of the image displayed on the mobile device in the first orientation, tracking the position of the unit portion in the image displayed on the mobile device in the second orientation when the mobile device shifts to the second orientation, and then repositioning the pointer to the position which corresponds to the unit portion of the image displayed on the mobile device in the second orientation. Moreover, it is appreciated that conventional control devices (e.g., a wired and/or wireless mechanical, optical, 3D, tactile mice, etc.), systems, and processes which can carry out limited but similar tasks performed by the devices, systems, and methods described in FIG. 1 through FIG. 16 may be used in parallel. For instance, the conventional control devices, system, and/or processes may perform one or more tasks when the gesture based control devices, systems, and/or or processes illustrated in the present disclosure cannot properly carry them out for any unforeseeable reasons, and vice versa.

The various devices, modules, analyzers, generators, etc. described herein may be enabled and operated using hardware circuitry (e.g., complementary metal-oxide-semiconductor (CMOS) based logic circuitry), firmware, software and/or any combination of hardware, firmware, and/or software (e.g., embodied in a machine readable medium). Further, the various electrical structure and methods may be embodied using transistors, logic gates, and/or electrical circuits (e.g., application specific integrated circuit (ASIC)). Although the present embodiments have been described with reference to specific example embodiments, it will be evident that various modifications and changes may be made to these embodiments without departing from the broader spirit and scope of the various embodiments.

What is claimed is:

1. An image display device, comprising:
a housing;
an orientation sensor configured to determine an orientation angle of the housing;
a display configured to display an image;
a camera configured to capture a user gesture in a field of view of the camera; and
a controller operatively coupled to the orientation sensor, the camera, and the display, the controller configured to:
generate trace data corresponding to the gesture captured by the camera in response to a receipt of the user gesture;
convert the user gesture to an execution command based on the orientation angle of the housing and the trace data; and
execute the execution command upon recognition of the user gesture as the execution command.

2. The image display device of claim 1, wherein the image display device is a mobile device.

3. The image display device of claim 2, wherein the mobile device includes a transceiver configured to communicate to another device.

4. The image display device of claim 1, wherein the trace data includes at least two of x, y, and z orthogonal coordinates relative to one of the camera and the orientation angle.

5. The image display device of claim 4, wherein the controller is configured to convert the captured user gesture into the trace data by
capturing, by the camera, a plurality of frames from an initial instance of the gesture to a final instance of the gesture; and
determining the at least two of the x, y, and z orthogonal coordinates of the trace data from the plurality of frames.

6. The image display device of claim 4, wherein the controller is configured to recognize the user gesture based on the trace data.

7. The image display device of claim 6, further comprising:
a memory operatively coupled to the controller and configured to store gesture information and a gesture-specific execution command that corresponds to the orientation angle,
wherein the controller is configured to access the gesture information and convert the recognized user gesture to the gesture-specific execution command that corresponds to the orientation angle.

8. The image display device of claim 7, wherein the controller is configured to convert the recognized user gesture into the gesture-specific execution command by determining that a pattern of the trace data substantially matches a pattern in the memory.

9. The image display device of claim 1, wherein the orientation sensor is an accelerometer, a gyroscope, or a magnetometer.

10. The image display device of claim 1, wherein the camera is a depth-aware camera, a stereo camera, or a digital camera.

11. The image display device of claim 1, wherein the controller is configured to control the display to display the image in one of a landscape orientation and a portrait orientation when the orientation angle of the housing is less than a threshold angle and to display the image in another of the landscape orientation and the portrait orientation when the orientation angle of the housing is greater than the threshold angle.

12. The image display device of claim 1, wherein the controller is configured to obtain the orientation angle by measuring an angle between a straight line crossing the camera in a lengthwise direction of the housing and a straight line crossing the camera in a widthwise direction of the housing.

13. An image display device, comprising:
a housing;
an orientation sensor configured to determine an orientation of the housing relative to a predetermined coordinate system;

a display configured to display an image;

a camera configured to capture an object in a field of view of the camera; and a controller coupled to the display, the orientation sensor and the camera, the controller configured to:

display a pointer on the display at a specific location relative to the displayed image, the specific location corresponding to a first orientation of the housing and a detected location of the object, and when the orientation of the housing is changed to a second orientation, reorient the image according to the second orientation while maintaining the pointer at the specific location relative to the displayed image.

14. The image display device of claim 13, wherein the controller is configured to identify coordinates of the pointer when the housing is in the first orientation, and wherein the controller is configured to maintain the pointer at the specific location relative to the displayed image when the housing is in the second orientation based on the coordinates.

15. The image display device of claim 13, wherein the controller is configured to determine a first distance between the pointer and a first part of the image and a second distance between the pointer and a second part of the image when the housing is in the first orientation, and wherein the controller is configured to maintain the pointer at the specific location relative to the displayed image when the housing is in the second orientation based on the first and second distances.

16. The image display device of claim 13, wherein the first orientation is one of a landscape orientation and a portrait orientation, and the second orientation is another of the landscape orientation and the portrait orientation.

17. The image display device of claim 13, wherein the controller is configured to detect the change of the housing to the second orientation when tilt data generated by the orientation sensor is greater than a threshold angle.

18. An image display device, comprising:

a housing;

an orientation sensor configured to determine an orientation of the housing;

a display configured to display an image;

a camera configured to capture an object in a field of view of the camera; and a controller coupled to the display, the orientation sensor and the camera, the controller configured to:

display a pointer on the display at a specific location, the specific location corresponding to the housing and a detected location of the object, reorient the image according to a second orientation when the orientation of the housing is changed to the second orientation, and display a pointer on the display at the specific location, the specific location corresponding to the housing and the detected location of the object regardless of the orientation of the housing.

\* \* \* \* \*